(12) United States Patent
Lee

(10) Patent No.: US 7,324,870 B2
(45) Date of Patent: Jan. 29, 2008

(54) CLEANING ROBOT AND CONTROL METHOD THEREOF

(75) Inventor: Dong Seok Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 709 days.

(21) Appl. No.: 10/878,055

(22) Filed: Jun. 29, 2004

(65) Prior Publication Data

US 2005/0149228 A1    Jul. 7, 2005

(30) Foreign Application Priority Data

Jan. 6, 2004    (KR) .................. 10-2004-0000686

(51) Int. Cl.
*G06F 19/00* (2006.01)
(52) U.S. Cl. .............. 700/245; 700/246; 700/247; 700/248; 700/249; 700/250; 700/251; 700/253; 700/254; 700/255; 700/256; 700/257; 700/258; 700/259; 700/264; 318/568.1; 318/568.11; 901/1; 901/47
(58) Field of Classification Search .......... 700/245, 700/246, 247, 248, 249, 250, 251, 252, 253, 700/254, 255, 256, 257, 258, 259, 264
See application file for complete search history.

(56) References Cited

U.S. PATENT DOCUMENTS 7,085,624 B2 *    8/2006    Aldred et al. ............... 700/253

FOREIGN PATENT DOCUMENTS

KR    1995-5402    5/1995

* cited by examiner

*Primary Examiner*—Thomas Black
*Assistant Examiner*—McDieunel Marc
(74) *Attorney, Agent, or Firm*—Staas & Halsey LLP

(57) ABSTRACT

A cleaning robot and a control method thereof in which a cleaning path desired by the user is recognizable by the cleaning robot, thereby being capable of cleaning a cleaning area desired by the user in a pattern desired by the user. The cleaning robot includes a running unit to run the cleaning robot, a storage unit for storing a running path, along which the cleaning robot has learned, and a control unit to recognize the learned running path of the cleaning robot when a path learning operation is required, to store the recognized learned running path in the storage unit, and to drive the running unit. When a cleaning operation of the cleaning robot along the stored learned running path is required, the control unit controls the running unit to cause the cleaning robot to perform the required cleaning operation while running along the stored learned running path. The user can directly input, to the cleaning robot, a cleaning path desired by the user, in order to cause the cleaning robot to perform a cleaning operation while running along the learned running path. Accordingly, it is possible to accurately inform the cleaning robot of various areas associated with the cleaning operation, for example, an area to be repeatedly cleaned at several times, or an area to be prevented from being cleaned.

14 Claims, 3 Drawing Sheets

CLEANING ROBOT AND CONTROL METHOD THEREOF

CROSS-REFERENCE TO RELATED APPLICATIONS

This application claims the benefit of Korean Patent Application No. 2004-686, filed on Jan. 6, 2004 in the Korean Intellectual Property Office, the disclosure of which is incorporated herein by reference.

BACKGROUND OF THE INVENTION

1. Field of the Invention

The present invention relates to a cleaning robot, and more particularly, to a cleaning robot adapted to perform a cleaning operation in a self-controlled manner (i.e., not being under the control of a person), and a control method thereof.

2. Description of the Related Art

A conventional cleaning robot recognizes, by itself, an area to be cleaned (hereinafter referred to as a "cleaning area") while running along the outline of the cleaning area surrounded by walls or furniture, and then cleans the recognized cleaning area while automatically running on the cleaning area.

However, such a conventional cleaning robot is configured to prevent the user from directly inputting information to the cleaning robot about a path to be cleaned. For this reason, the conventional cleaning robot must clean the cleaning area in a fixed pattern along a fixed cleaning path.

As a result, such a conventional cleaning robot has a problem in that it cannot clean a cleaning area desired by the user in a pattern desired by the user.

SUMMARY OF THE INVENTION

Accordingly, it is an aspect of the present invention to provide a cleaning robot and a control method thereof in which a cleaning path desired by the user is recognizable by the cleaning robot, thereby being capable of cleaning a cleaning area desired by the user in a pattern desired by the user.

Additional aspects and/or advantages of the invention will be set forth in part in the description which follows and, in part, will be obvious from the description, or may be learned by practice of the invention.

The foregoing and/or other aspects of the present invention are achieved by providing a cleaning robot to perform a cleaning operation while running along a cleaning path, comprising a running unit to run the cleaning robot, a storage unit to store a running path, along which the cleaning robot has learned, and a control unit to recognize the learned running path of the cleaning robot when a path learning operation is required, to store the recognized learned running path in the storage unit, and to drive the running unit, wherein the control unit controls the running unit when a cleaning operation of the cleaning robot along the stored learned running path is required, to allow the cleaning robot to perform the cleaning operation while running along the stored learned running path.

It is another aspect of the present invention to provide a method for controlling a cleaning robot to perform a cleaning operation while running along a cleaning path, comprising recognizing a learned running path of the cleaning robot when a path learning operation is required, and storing the recognized learned running path, and controlling the cleaning robot to perform a cleaning operation while running along the stored learned running path when the cleaning operation of the cleaning robot along the stored learned running path is required.

It is another aspect of the present invention to provide a method for controlling a cleaning robot to perform a cleaning operation while running along a cleaning path, comprising recognizing a plurality of learned running paths of the cleaning robot when a path learning operation is required, and storing the recognized plurality of learned running paths, and, controlling the cleaning robot to perform a cleaning operation while running along a selected learned running path when a cleaning operation of the cleaning robot along one of the plurality of learned running paths selected by a user from the stored plurality of learned running paths is required.

It is another aspect of the present invention to provide a method for controlling a cleaning robot to perform a cleaning operation while running along a cleaning path, comprising detecting a plurality of learned running paths of the cleaning robot operated by a user, and storing the detected learned running paths, storing reserved times respectively inputted by the user corresponding to the stored learned running paths, and controlling the cleaning robot to perform a cleaning operation at the reserved times, while running along the corresponding learned running paths, respectively.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
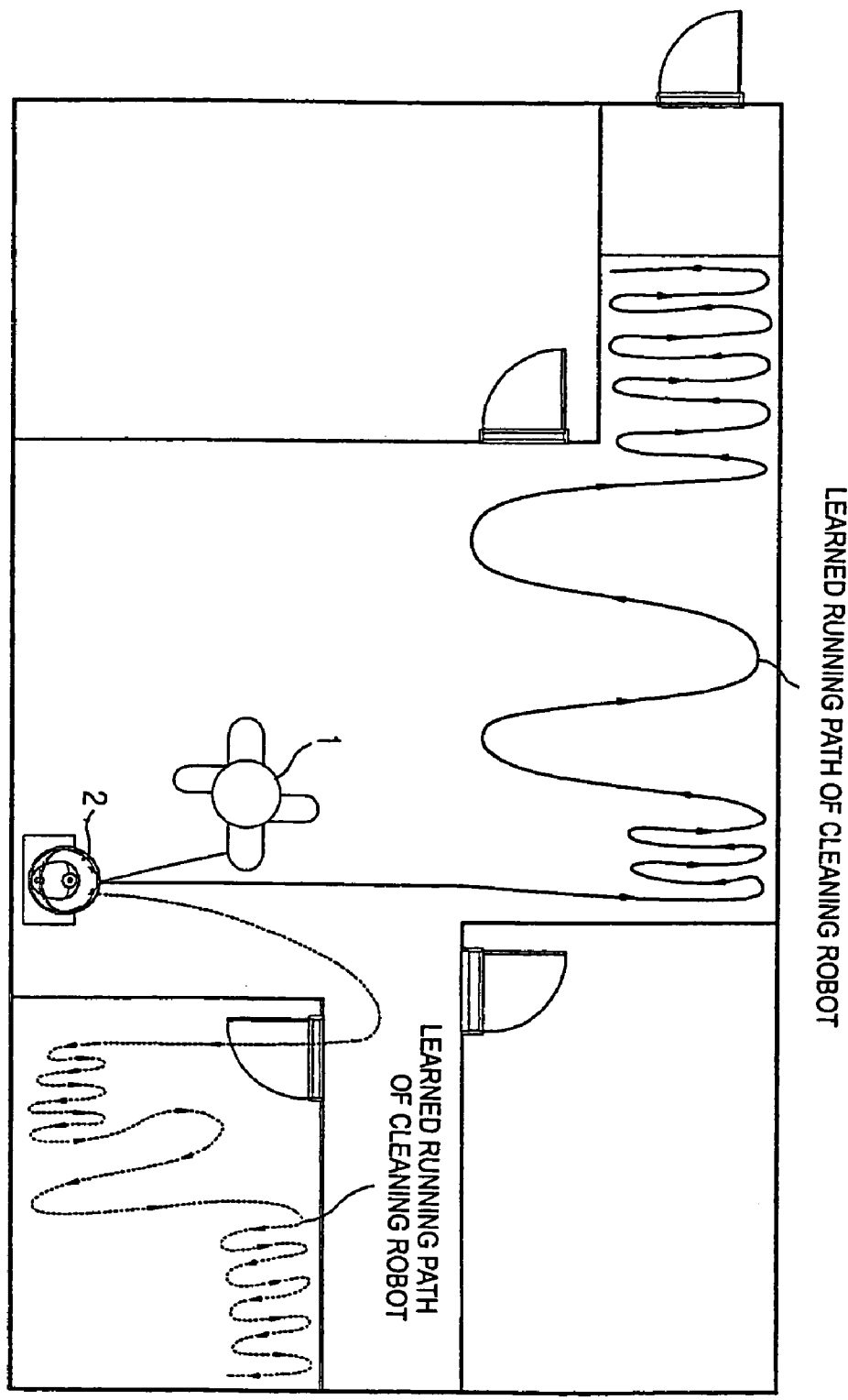
FIG. 1 is a schematic view for explaining operation of a cleaning robot according to the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

FIG. 1 is a schematic view for explaining operation of a cleaning robot according to the present invention. In accordance with the present invention, the cleaning robot is configured to recognize a cleaning path, to be cleaned, as desired by the user, and to perform a cleaning operation while running along the recognized cleaning path. In order to implement such a concept of the present invention, as shown in FIG. 1, a user 1 first walks along a path to be cleaned while leading the cleaning robot 2 along the cleaning path. At this time, the cleaning robot 2 recognizes the cleaning path, along which it has actually run, and stores the recognized learned running path. When the user 1 subsequently commands an automatic cleaning operation to the cleaning robot 2, the cleaning robot 2 performs a cleaning operation while running along the stored learned running path.

Thus, the cleaning robot 2 according to the present invention performs a cleaning operation under the condition in which the user has taught the cleaning robot 2 to learn a cleaning path, as compared to the conventional cleaning robot, which is configured to have a fixed cleaning pattern in that it recognizes, by itself, a cleaning area while running along the outline of the cleaning area surrounded by walls or furniture, and then cleans the recognized cleaning area while automatically running on the cleaning area. Accordingly, the cleaning robot 2 of the present invention is more efficient than the conventional cleaning robot because it is possible to vary a cleaning area in such a manner that the cleaning robot concentratedly cleans only a local region of a confined area desired, to be cleaned, by the user without cleaning the remaining, unnecessary regions of the confined area.

Figure 2:
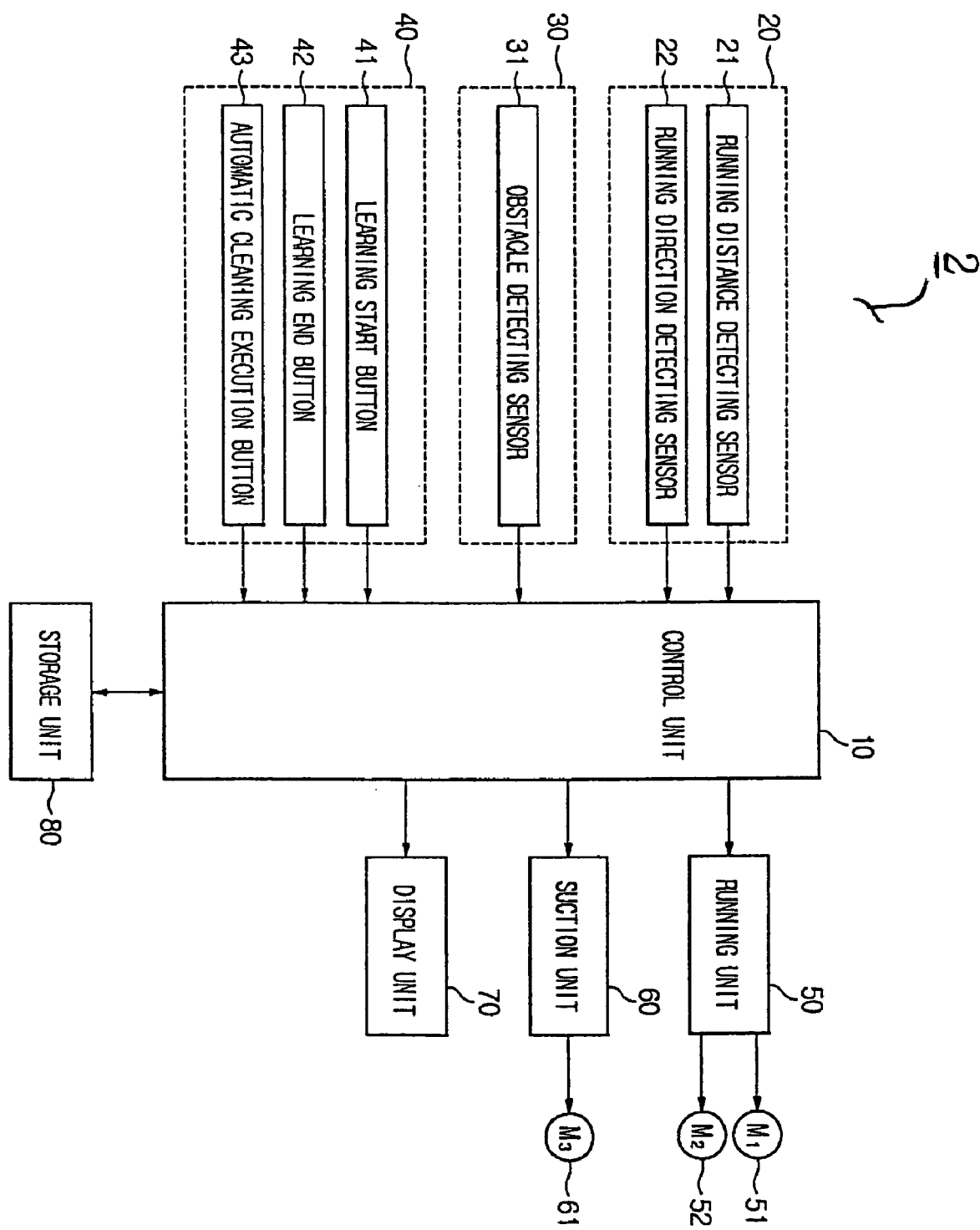
FIG. 2 is a block diagram illustrating a configuration of the cleaning robot including a control configuration as shown in FIG. 1.

FIG. 2 is a block diagram illustrating a configuration of the cleaning robot 2 including a control configuration in accordance with an embodiment of the present invention. Referring to FIG. 2, the cleaning robot 2 comprises a control unit 10 for controlling the entire operation of the cleaning robot. The cleaning robot 2 further comprises a running path detecting unit 20 to detect a learned running path of the cleaning robot 2, an obstacle detecting unit 30 to detect an obstacle existing on the running path of the cleaning robot, and a key input unit 40 to receive various robot control commands inputted by the user, wherein the running path detecting unit 20, the obstacle detecting unit 30, and the key input unit 40 are electrically connected to an input of the control unit 10.

The cleaning robot 2 further comprises a running unit 50 to drive wheel motors 51 and 52 to rotate opposite front wheels provided at a body of the cleaning robot, thereby straightly running or turning the cleaning robot, a suction unit 60 to drive a suction motor to pick up particles attached to a bottom of the body of the robot through an inlet, and to feed the particles to a dust collecting filter, thereby removing the particles, and a display unit 70 to display information to allow the user to input a desired control command and to identify information corresponding to the inputted control command, wherein the running unit 50, the suction unit 60, and the display unit 70 are electrically connected to an output of the control unit 10.

The running path detecting unit 20 comprises a running distance detecting sensor 21 to detect respective RPMs of the wheel motors 51 and 52, and a running direction detecting sensor 22 to detect an angular velocity of rotation of the cleaning robot.

The obstacle detecting unit 30 comprises a plurality of obstacle detecting sensors 31 to detect an obstacle in accordance with a transmission and a reception of an infrared ray, and to detect a distance of the detected obstacle from the cleaning robot. Each obstacle detecting sensor 31 comprises an infrared light emitting element to emit an infrared ray, and a light receiving element to receive a reflected light of the infrared ray.

The key input unit 40 comprises a learning start button 41 to activate a learning operation prior to running of the cleaning robot 2, to cause the cleaning robot to store a learned running path thereof, along which the cleaning robot is moved by the user. The key input unit 40 further comprises a learning end button 42, and an automatic cleaning execution button 43 to allow the cleaning robot 2 to perform an automatic cleaning operation while running the learned running path stored therein.

A storage unit 80 is also electrically connected to an input/output of the control unit 10. The storage unit 80 stores the learned running path of the cleaning robot 2, detected by the running path detecting unit 20 in response to key inputs from the learning start and end buttons 41 and 42, under the control of the control unit 10.

Figure 3:
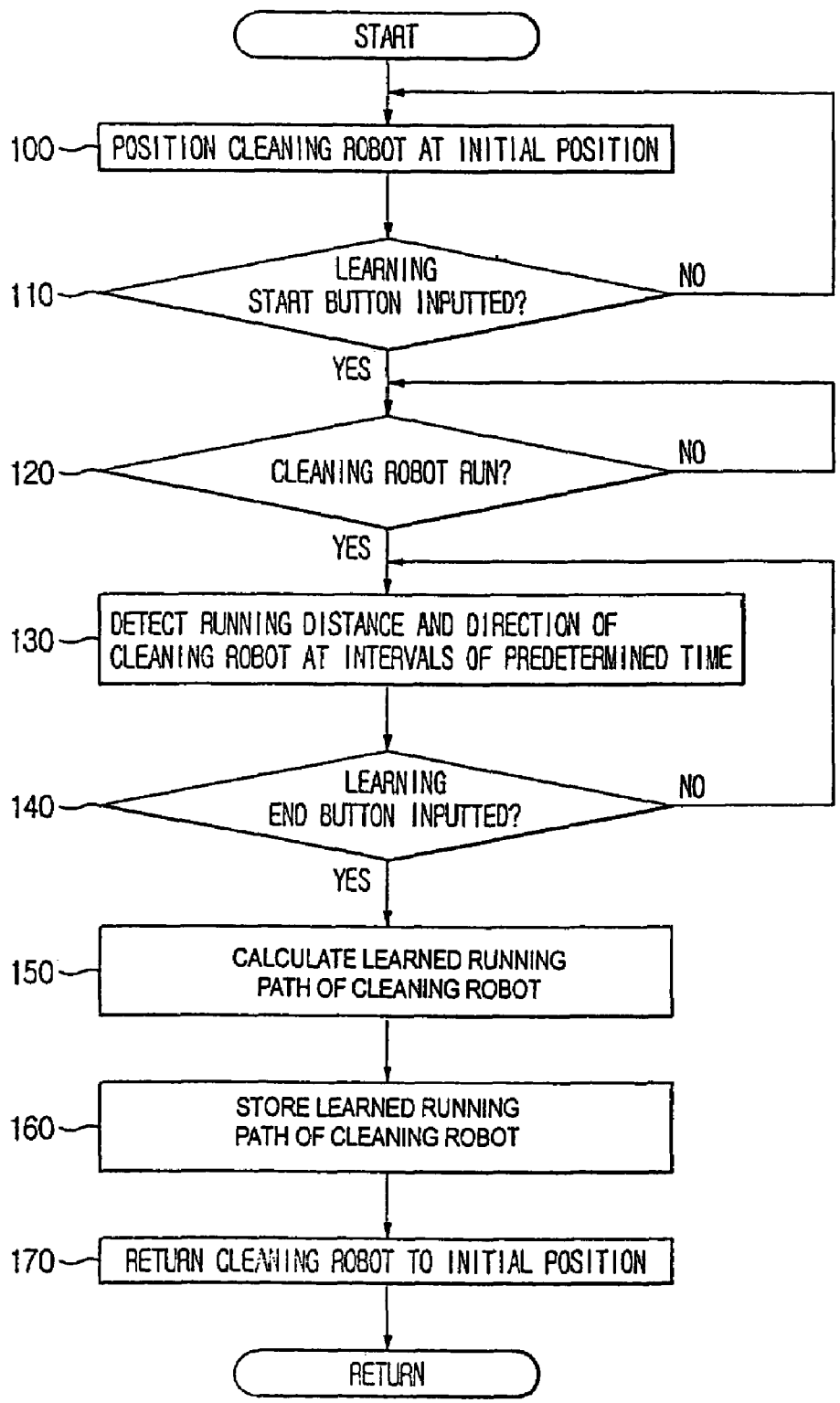
FIG. 3 is a flow chart illustrating a method for controlling the cleaning robot as shown in FIG. 1.

A method for controlling the cleaning robot 2 having the above described configuration in accordance with operation of the control unit will be described below with reference to FIG. 3. In accordance with the illustrated control method, the cleaning robot 2 is first positioned at an initial position (operation 100). This initial position corresponds to a position where a charging device for charging the cleaning robot 2 is positioned.

In this state, the control unit 10 determines whether or not a key signal from the learning start button 41 has been inputted by the user (operation 110). Where it is determined in operation 110 that no key signal from the learning start button 41 has been inputted, the control unit 10 maintains the cleaning robot 2 at the initial position.

On the other hand, where it is determined in operation 110 that the key signal from the learning start button 41 has been inputted, the control unit 10 determines, through the running distance detecting sensor 21, whether or not the cleaning robot moves (operation 120).

When it is determined in operation 120 that the cleaning robot 2 moves, the control unit 10 detects the running distance and direction of the cleaning robot at intervals of a predetermined time, through the running distance and direction detecting sensors 21 and 22, until a key signal from the learning end button 42 is inputted (operation 130). At this time, information about the running distance and direction of the cleaning robot detected in operation 130 is temporarily stored in the storage unit 80.

Following each detecting operation in operation 130, the control unit 10 determines whether or not the key signal from the learning end button 42 has been inputted (operation 140). When it is determined in operation 140 that no key signal from the learning end button 42 has been inputted, the control unit 10 returns its control routine to operation 130. On the other hand, when the key signal from the learning end button 42 has been inputted, the control unit 10 calculates the learned running path of the cleaning robot 2, based on the information corresponding to respective running distances and directions of the cleaning robot 2 temporarily stored in the storage unit 80 at intervals of the predetermined time (operation 150).

The learned running path of the cleaning robot 2 calculated in operation 150 is then stored in the storage unit 80 (operation 160).

After completion of the storage of the learned running path in operation 160, in operation 170, the control unit 10 completes the running path learning operation, and simultaneously operates the running unit to return the cleaning robot 2 to its original position (i.e., its initial position).

When the user inputs a key signal through the automatic cleaning execution button 43 provided at the key input unit 40 under the above condition, the control unit 10 drives the running unit 50, based on the learned running path of the cleaning robot 2 stored in the storage unit 80, thereby allowing the cleaning robot 2 to execute a cleaning operation while running along the learned running path stored in the storage unit 80. At this time, the control unit 10 drives the wheel motors 51 and 52 in accordance with a control operation of the running unit 50, while driving the suction motor 61 in accordance with a control operation of the suction unit 60, thereby allowing the cleaning robot 2 to remove particles existing on the learned running path, while running along the learned running path.

Although the present invention has been described in conjunction with the embodiment in which there is only one learned running path of the cleaning robot, it is not limited to this embodiment. For instance, various learned running paths of the cleaning robot respectively associated with various confined spaces to be cleaned, for example, a living room, a main room, and other small rooms, may be stored in the cleaning robot. In this case, the user selects a desired one of the stored learned running paths while identifying the learned running paths through the key input unit 40 and display unit 70, in order to allow the cleaning robot to perform a cleaning operation along a selected learned running path. When cleaning operations are reserved to be executed at desired times corresponding to the learned running paths, respectively, more excellent effects are obtained because the cleaning robot can perform every reserved cleaning operation at the corresponding reserved time while running along the corresponding learned running path. In this case, the storage unit 80 stores the learned running paths of the cleaning robot corresponding to respective reserved times, along with the reserved times.

As apparent from the above description, in accordance with the present invention, the user can directly input, to the cleaning robot, a cleaning path desired by the user, in order to allow the cleaning robot to perform a cleaning operation while running along the cleaning path. Accordingly, it is possible to accurately inform the cleaning robot of various areas associated with the cleaning operation, for example, an area to be repeatedly cleaned at several times, or an area to be prevented from being cleaned.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cleaning robot for performing a cleaning operation while running along a cleaning path, comprising:
   a running unit to run the cleaning robot;
   a storage unit to store a running path, along which the cleaning robot has learned;
   a control unit to recognize the learned running path of the cleaning robot when a path learning operation is required, to store the recognized learned running path in the storage unit, and to drive the running unit; and
   a running path detecting unit to detect the learned running path of the cleaning robot moved by a user, and to store the learned running path in the storage unit,
   wherein the control unit controls the running unit when a cleaning operation of the cleaning robot along the stored learned running path is required, to allow the cleaning robot to perform the required cleaning operation while running along the stored learned running path, and
   the control unit stores a reserved time in the storage unit, inputted by a user corresponding to the stored learned running path, and drives the running unit at the reserved time to allow the cleaning robot to perform the cleaning operation while running along the corresponding learned running path.

2. The cleaning robot of claim 1, wherein the running path detecting unit comprises:
   a running distance detecting sensor to detect a running distance of the cleaning robot; and
   a running direction detecting sensor to detect a running directional change of the cleaning robot,
   wherein the control unit detects the running distance and the running directional change of the cleaning robot at intervals of a predetermined time.

3. The cleaning robot of claim 1, further comprising:
   a key input unit having learning start and end buttons to be operated by the user to start and end the path learning operation,
   wherein the learned running path of the cleaning robot corresponds to the cleaning path, along which the cleaning robot runs after a key signal from the learning start button is inputted and until a key signal from the learning end button is inputted.

4. The cleaning robot of claim 3, further comprising an obstacle detecting unit to detect an obstacle existing on the learned running path of the cleaning robot.

5. The cleaning robot of claim 4, wherein the obstacle detecting unit comprises a plurality of obstacle detecting sensors to detect the obstacle in accordance with a transmission and a reception of an infrared ray, and to detect a distance of the detected obstacle from the cleaning robot.

6. The cleaning robot of claim 5, wherein each obstacle detecting sensor comprises:
   an infrared light emitting element to emit the infrared ray; and
   a light receiving element to receive a reflected light of the infrared ray.

7. The cleaning robot of claim 3, wherein the key input unit further comprises an automatic cleaning execution button to allow the cleaning robot to perform an automatic cleaning operation while running along the learned running path stored therein.

8. The cleaning robot of claim 1, wherein the storage unit stores a plurality of learned running paths, and the control unit drives the running unit to allow the cleaning robot to perform a cleaning operation while running along one of the plurality of learned running paths selected by a user from the stored plurality of learned running paths.

9. The cleaning robot of claim 1, further comprising a running unit to drive wheel motors to rotate opposite front wheels provided at a body of the cleaning robot, to enable the cleaning robot to run or rotate.

10. The cleaning robot of claim 9, further comprising:
    a suction unit and a suction motor, wherein the suction unit drives the suction motor to pick up particles attached to a bottom of the body of the cleaning robot through an inlet and to feed the particles to a dust collecting filter.

11. The cleaning robot of claim 10, further comprising a display unit to display information to allow the user to input a control command and to identify information corresponding to the inputted control command.

12. A method for controlling a cleaning robot to perform a cleaning operation while running along a cleaning path, comprising:
    recognizing a learned running path of the cleaning robot when a path learning operation is required, and storing the recognized running path;
    controlling the cleaning robot to perform a cleaning operation while running along the stored learned running path when a cleaning operation of the cleaning robot along the stored learned running path is require;
    storing a reserved time inputted by a user corresponding to the stored learned running path; and
    controlling the cleaning robot to perform the cleaning operation at the reserved time, while running along the corresponding learned running path, wherein the recognizing of the learning running path of the cleaning robot comprises detecting the learned running path of the cleaning robot moved by a user and storing the detected learned running path.

13. A method for controlling a cleaning robot to perform a cleaning operation while running along a cleaning path, comprising:

detecting a plurality of learned running paths of the cleaning robot moved by a user, and storing the detected learned running paths;

storing reserved times respectively inputted by the user corresponding to the stored plurality of learned running paths; and controlling the cleaning robot to perform a cleaning operation at the reserved times, while running along the corresponding plurality of learned running paths, respectively.

14. A cleaning robot for performing cleaning operations while running along cleaning paths, comprising:

a running unit to move the cleaning robot;

a storage unit to store reserved times and learned running paths corresponding to the reserved times of the cleaning robot; and a control unit to recognize the learned running paths in the storage unit, and to drive the running unit, wherein the cleaning robot performs the cleaning operations corresponding to the reserved times selected by a user while running along the stored learned running paths and wherein the learned running paths are determined by the robot first traversing the running paths prior to performing the cleaning operations.

* * * * *

UNITED STATES PATENT AND TRADEMARK OFFICE
CERTIFICATE OF CORRECTION

PATENT NO.        : 7,324,870 B2                                Page 1 of 1
APPLICATION NO. : 10/878055
DATED             : January 29, 2008
INVENTOR(S)       : Dong Seok Lee It is certified that error appears in the above-identified patent and that said Letters Patent is hereby corrected as shown below:

Column 6, Line 61, change "require;" to --required;--.

Signed and Sealed this

Twenty-fourth Day of June, 2008

JON W. DUDAS
*Director of the United States Patent and Trademark Office*